(12) United States Patent
Lee et al.

(10) Patent No.: US 9,671,447 B2
(45) Date of Patent: Jun. 6, 2017

(54) METHOD OF ANALYZING ERROR RATE IN SYSTEM-ON-CHIP

(71) Applicant: Foundation for Research & Business, Seoul National University of Science & Technology, Seoul (KR)

(72) Inventors: Seung Eun Lee, Seoul (KR); Yeong Seob Jeong, Gangwon-do (KR); Seong Mo Lee, Seoul (KR)

(73) Assignee: FOUNDATION FOR RESEARCH & BUSINESS, SEOUL NATIONAL UNIVERSITY OF SCIENCE & TECHNOLOGY, Seoul (KR)

( * ) Notice: Subject to any disclaimer, the term of this patent is extended or adjusted under 35 U.S.C. 154(b) by 66 days.

(21) Appl. No.: 14/585,982

(22) Filed: Dec. 30, 2014

(65) Prior Publication Data

US 2015/0186199 A1  Jul. 2, 2015

(30) Foreign Application Priority Data

Dec. 30, 2013 (KR) .................. 10-2013-0167254

(51) Int. Cl.
*G01R 31/00* (2006.01)
*G06F 17/50* (2006.01)

(52) U.S. Cl.
CPC ......... *G01R 31/00* (2013.01); *G06F 17/5022* (2013.01); *G06F 2217/10* (2013.01)

(58) Field of Classification Search
CPC .................. G06F 11/1012; G06F 11/1076
See application file for complete search history.

(56) References Cited

U.S. PATENT DOCUMENTS

| | | | | |
|---|---|---|---|---|
| 6,796,213 | B1* | 9/2004 | McKendree | F41A 17/08 89/1.11 |
| 7,480,838 | B1* | 1/2009 | Wilkerson | G06F 11/0724 714/700 |
| 2012/0159269 | A1* | 6/2012 | Ibe | H03K 19/0033 714/704 |
| 2013/0007561 | A1* | 1/2013 | Motwani | H03M 13/1102 714/758 |

* cited by examiner

*Primary Examiner* — Jigar Patel
(74) *Attorney, Agent, or Firm* — Harness, Dickey & Pierce, P.L.C.

(57) ABSTRACT

In order to improve reliability of a system-on-chip (SoC) through fault tolerance verification, there is provided a method of analyzing an error rate in a system-on-chip (SoC) having at least one internal block obtained by interconnecting two or more gates, comprising: applying an input signal to an input terminal of a certain internal block; defining an input error rate of each gate of the internal block; and defining an output error rate of the internal block based on the input error rate of each gate and an error rate propagating to an output terminal. As a result, there is proposed a method of analyzing a change of the output error rate depending on the input error rate in a gate level in error model development necessary to design and verify a fault-tolerant SoC. Therefore, it is possible to analyze errors in each gate and formularize error rate information modeling including an input/output relationship between each gate of a digital circuit in a library form.

5 Claims, 4 Drawing Sheets

$$P(i) = P_p(i) + \gamma$$
$$P(j) = P_p(j) + \gamma$$

| $i$ | $j$ | $o$ | $P_p(o)$ |
|---|---|---|---|
| 0 | 0 | 0 | P(i)*P(j) |
| 0 | 1 | 0 | P(i)*(1-P(j)) |
| 1 | 0 | 0 | (1-P(i))*P(j) |
| 1 | 1 | 1 | 1-{(1-P(i))*(1-P(j))} |

| $i$ | $j$ | $o$ | $P_p(o)$ |
|---|---|---|---|
| 0 | 0 | 0 | $P(i)*P(j)$ |
| 0 | 1 | 0 | $P(i)*(1-P(j))$ |
| 1 | 0 | 0 | $(1-P(i))*P(j)$ |
| 1 | 1 | 1 | $1-\{(1-P(i))*(1-P(j))\}$ |

| $i$ | $j$ | $o$ | $P_p(o)$ |
|---|---|---|---|
| 0 | 0 | 0 | $1-\{(1-P(i))*(1-P(j))\}$ |
| 0 | 1 | 1 | $(1-P(i))*P(j)$ |
| 1 | 0 | 1 | $P(i)*(1-P(j))$ |
| 1 | 1 | 1 | $P(i)*P(j)$ |

| $i$ | $o$ | $P_p(o)$ |
|---|---|---|
| 0 | 1 | $P(i)$ |
| 1 | 0 | $P(i)$ |

METHOD OF ANALYZING ERROR RATE IN SYSTEM-ON-CHIP

CROSS REFERENCES TO RELATED APPLICATIONS

The present invention contains subject matter related to Korean Patent Application No. 2013-0167254, filed in the Korean Patent Office on Dec. 30, 2013, the entire contents of which are incorporated herein by reference.

BACKGROUND OF THE INVENTION

Field of the Invention

The present invention relates to a method of deriving an error correction means suitable for the entire system in consideration of influence from an input error rate of a certain gate to an output error rate of the gate and a course of propagating an error rate between gates when the error is injected to the input of a system block or the inside of the block in order to improve reliability of a System-on-Chip (SoC) through fault tolerance verification.

Description of Related Art

As a semiconductor manufacturing process technology is improved, and a highly integrated circuit can be implemented, a system-on-chip (SoC) has been proposed, in which various semiconductor components such as a processor, a memory, and a peripheral are implemented on a single chip.

The "SoC" is a semiconductor integrated circuit that integrates all components of the entire system into a single chip, by which main semiconductor elements such as a computation element, a storage element, and a data conversion element can be implemented on a single chip. That is, a single chip can be operated as a single system by integrating main components such as a central processing unit (CPU), a digital signal processing (DSP) chip, and a microcontroller (MCU) on a single semiconductor package. By integrating various functionalities into a single semiconductor chip, it is possible to dramatically reduce a space on a circuit board and a system size. As a result, it is possible to miniaturize various electronic systems. Furthermore, compared to a case where several semiconductor chips are separately manufactured, a manufacturing cost can be remarkably reduced, so that it is possible to lower the price of the entire system.

Therefore, the SoC technology that integrates functionalities of all components on a single chip arises as a core component technology in the high technology digital era characterized in high performance, low cost, and miniaturization. Continuous performance improvement in such a SoC technology makes the number of semiconductor components integrated on a single chip gradually increasing. Accordingly, a test for detecting a defect in the SoC is emerging as an important issue.

As a process technology is improved, a reliability problem that may cause a failure in the functionality of the digital circuit becomes important. Although several error correction techniques have been implemented in order to address such a problem, they are expensive. Therefore, system semiconductor designers began to consider fault tolerance as one of important design factors in addition to performance and low power consumption.

The failure can occur based on a lot of factors. In many cases, the failure in the system functionality is generated from a manufacturing process or environmental factors after the manufacturing. If a semiconductor is aged as a service time increases, a problem may occur in a switching timing, or alpha particles may generate a data error due to cosmic rays coming from the universe and reacting with the air. In addition, an erroneous operation of the entire system may also occur due to crosstalk, which is electrical interference between various wiring lines caused by narrowing a gap therebetween, various radioactive rays emitted from a radioactive decay, thermal noise that influences on a threshold voltage of a semiconductor, and the like.

The SoC may suffer from a failure due to an environmental change such as cosmic ray particles, power noise, and crosstalk. A temporary error that hinders a normal operation without disrupting a digital circuit is called a soft error.

In 1962, there was a prediction that a circuit might fail due to cosmic ray particles. In 1975, a circuit failure caused by cosmic rays was reported the first time. In 1978, a soft error was observed in an SRAM lying on a soil surface, and a research for overcoming such an error began along with error modeling.

In the SoC, power noise (voltage drop) and radiations remarkably contribute to an increase of the error rate. In addition, thermal noise also generates an error that hinders a normal operation of a circuit. Various other changes of external environments hinder a normal operation of the SoC and generate an error.

Errors caused by various factors in this way may hinder normal operation of the SoC and may generate a circuit failure in reality. In some case, errors may be blocked internally, and the circuit may operate normally.

An error of a circuit generated in the SoC may be internally blocked using some techniques such as logic masking, temporal masking, or electrical masking, and the circuit may operate normally.

As described above, various types of faults occur in a circuit due to various types of factors. Hardware faults may be classified into a permanent fault, an intermittent fault, and a transient fault depending on how frequently it occurs in a circuit. Such faults adversely affect a circuit, so that a data error may occur, in which data unintentionally changes in reality. The soft error is an error that changes only data without harming hardware due to surrounding environmental factors. In order to recognize and cope with such an error of a circuit, it is necessary to perform modeling regarding when, where, and how frequently errors occur, and how the system responds to such an error.

It is also desirable to perform modeling regarding whether or not a failure occurs in the SoC due to a single or multiple errors as well as frequency, location, and time of the errors in the SoC.

Circuit-level error modeling is easy to perform using a commercial simulation solution. In addition, it is easy to change or monitor node values inside a circuit under a simulation environment. However, the circuit-level modeling takes a lot of time to validate efficiency of a fault-tolerant design method for a relatively complicated SoC based on a circuit-level error model.

Gate-level error modeling is used when the error modeling of each gate is simulated by performing error modeling for each type of the gate used in the SoC. The gate-level error model is also easily used to derive an analytical method. In addition, a fault-tolerant platform can be relatively easily developed by applying a net list of the SoC. However, it takes long time to validate efficiency of the fault-tolerant design method in the SoC level.

Chip-level error modeling enables a designer to perform a high-level simulation based on an analytic method by performing modeling in a high level. In addition, a resultant model is relatively simple, so that it takes less time in development of an error verification platform and validation of a fault-tolerant design method. However, it is difficult to analyze operations for the errors in internal blocks of the SoC by determining an error in a chip level.

Modeling techniques can be classified into system-level modeling, register-transfer-level (RTL-level) modeling, gate-level modeling, switch-level modeling, physical-level modeling, and the like depending a circuit approach level. There are some differences in accuracy and complexity between each technique. The reliability verification takes more time as a modeling level becomes delicate from the system level to the semiconductor level. Therefore, a designer should select an analysis level which is suitable for a design specification and conditions to verify fault resilience of a circuit. The gate-level modeling is faster than the switch-level modeling, which necessitates consideration on operations of a semiconductor, and is more accurate than the system-level modeling and the RTL-level modeling.

CITATION LIST

Patent Literatures

[Patent Literature 1] Korean Patent Application Publication No. 10-2011-0071254

SUMMARY OF THE INVENTION

In view of the aforementioned problems, the present invention proposes a method of analyzing influence of an input error rate of a certain gate and an internal error rate of the gate on an output error rate of the gate and analyzing an error rate of the entire system semiconductor (SoC) using gate interconnection network information of the system semiconductor in order to improve reliability of the system semiconductor through fault tolerance verification.

The object of the present invention is not limited to those described above, and a person skilled in the art would apparently appreciate other objects by reading the following descriptions.

According to an aspect of the present invention, there is provided a method of analyzing an error rate in a system-on-chip (SoC) having at least one internal block obtained by interconnecting two or more gates, comprising: applying an input signal to an input terminal of a certain internal block; defining an input error rate of each gate of the internal block; and defining an output error rate of the internal block based on the input error rate of each gate and an error rate propagating to an output terminal.

The method may further comprise, after defining the output error rate of the internal block, repeating a process of sequentially applying input signals for all possible cases and defining the output error rate of the internal block; and analyzing the defined output error rate to derive an error rate caused by the input of the internal block.

In the method described above, if an error rate generated from the input terminal or the inside of the gate due to alpha particles emitted from radioactive isotopes, thermal noise, neutrons, and a change of external environments is called a soft error rate (SER), the input error rate of each gate may be expressed as a sum of the error rate propagating from an output of the front stage and the soft error rate.

In defining the output error rate of the internal block, the output error rate of the internal block may be defined using information regarding propagation of the error rate between the gates based on information regarding an interconnection network between the gates of the internal block.

In the method described above, input statistic information of each gate may be analyzed by performing simulation, and the input error rate and the output error rate of each gate may be modeled using the input statistic information.

In the method described above, the input error rate and the output error rate of each gate may be modeled by assuming that the input signals applied to the input terminal of each gate are exhibited with the same frequency.

According to the present invention, there is proposed a method of analyzing a change of the output error rate depending on the input error rate in a gate level in development of an error model necessary to design and verify a fault-tolerant SoC, so that it is possible to formularize error rate information modeling in a library form, including an error analysis for each gate and an input/output relationship between gates of a digital circuit.

In addition, it is possible to provide accuracy and reliability in the error rate analysis for the system output using the formularized library.

Furthermore, it is possible to allow a designer to determine a degree of the error correction technique for the block where errors frequently occur so as to reduce a reliability improvement cost.

BRIEF DESCRIPTION OF THE DRAWINGS

The foregoing and additional features and characteristics of this disclosure will become more apparent from the following detailed description considered with reference to the accompanying drawings, wherein.

DETAILED DESCRIPTION OF THE INVENTION

Figure 1:
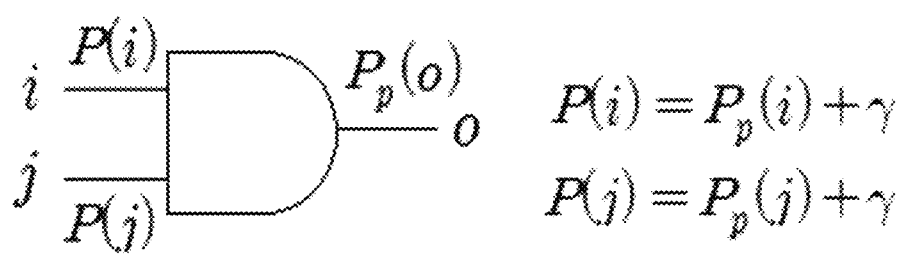
FIG. 1 is a logic diagram exemplarily illustrating that an error rate of the input propagates to an error rate of the output in an AND gate according to an embodiment of the present invention.

Since the present invention may be modified or embodied in various forms, particular embodiments will be described in detail with reference to the accompanying drawings. However, it should be noted that they are not intended to limit the invention, but include all possible modifications, equivalents, and substitutes within the scope and spirit of the present invention.

The terminology used herein is only for the purpose of describing particular embodiments and is not intended to limit the invention. As used herein, the singular forms "a", "an" and "the" may be intended to include the plural forms as well, unless the context clearly indicates otherwise. It is further to be noted that, as used herein, the terms "comprises", "comprising", "include", and "including" indicate the presence of stated features, integers, steps, operations, units, and/or components, but do not preclude the presence or addition of one or more other features, integers, steps, operations, units, and/or components, and/or combination thereof.

Unless specified otherwise, all terminologies used herein, including technical and scientific terminologies, have the same meaning as those understood generally by a person skilled in art. Terminologies defined in a general dictionary are to be construed as the same meanings as those understood in the context of the related art. Unless specified clearly herein, they are not construed as ideal or excessively formal meanings.

It is noted that like reference numerals denote like elements throughout overall drawings. In addition, descriptions of well-known apparatus and methods may be omitted so as to not obscure the description of the representative embodiments, and such methods and apparatus are clearly within the scope and spirit of the present disclosure.

The present invention relates to an error rate analysis method in a system-on-chip (SoC) comprising at least one internal block obtained by interconnecting two or more gates.

According to the present invention, in order to perform a SoC gate-level error rate analysis, a gate error model of the entire circuit is implemented in an analytical manner based on interconnect information of internal gate connection elements.

Figure 6:
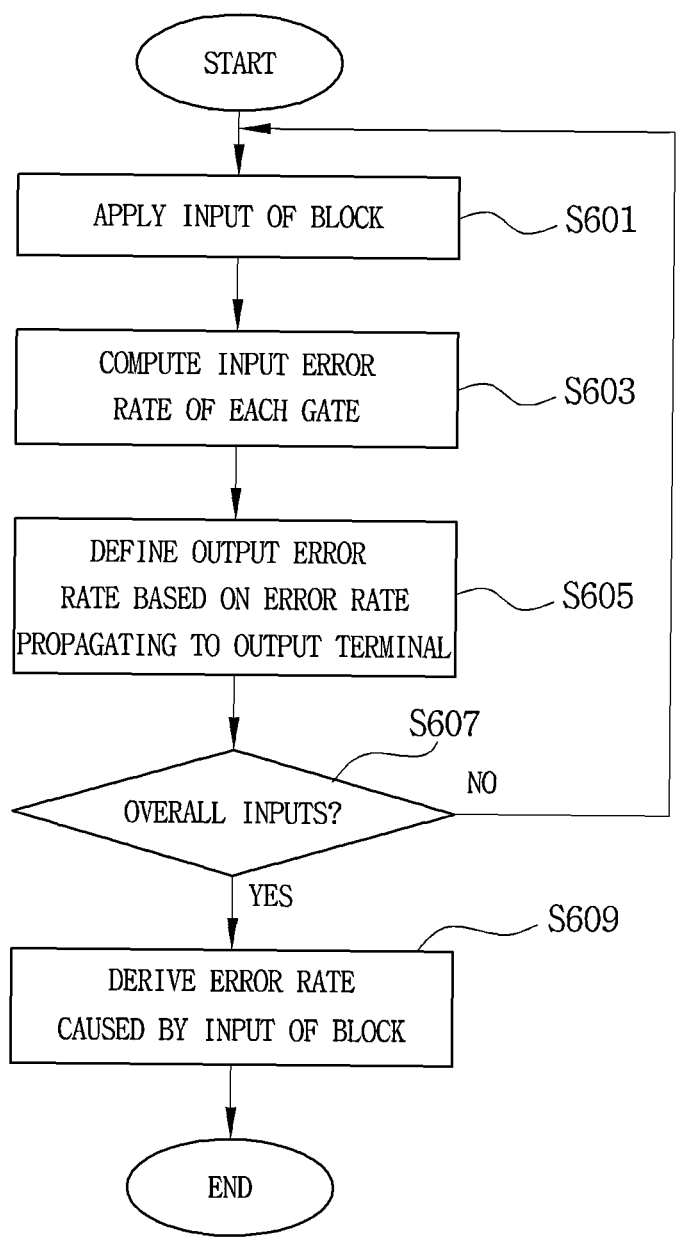
FIG. 6 is a flowchart illustrating an error rate analysis method in a SoC according to an embodiment of the present invention.

FIG. 6 is a flowchart illustrating an error rate analysis method in a SoC according to an embodiment of the present invention.

Referring to FIG. 6, an input signal is applied to an input terminal of a certain internal block of the SoC in step S601.

Then, input error rates of each gate of the internal block are defined in step S603.

Then, an output error rate of the internal block is defined using the input error rates of each gate and an error rate propagating to the output terminal in step S605.

Then, it is checked whether or not all of the input signals are applied for all possible cases in step S607. In step S607, the process of defining the output error rate of the internal block by sequentially applying input signals is repeated until the input signals are applied for all possible cases.

If the input signals are applied for all cases, an error rate caused by the input of the internal block is obtained by analyzing the defined output error rate in step S609.

An error rate generated from the input terminals or the inside of the gate due to alpha particles emitted from radioactive isotopes, thermal noise, neutrons, and a change of external environments is called a soft error rate (SER). The input error rate of each gate can be expressed as a sum of the error rate propagating from an output of the front stage and the soft error rate.

According to an embodiment of the present invention, the output error rate of the internal block can be defined using the information regarding the error rate propagating between gates based on gate interconnection network information of the internal block in step S605.

According to an embodiment of the present invention, input statistic information of each gate is analyzed through a simulation, and the input error rate and the output error rate of each gate can be modeled using the input statistic information.

According to another embodiment of the present invention, the input error rate and the output error rate of each gate can be modeled by assuming that the input signal applied to the input terminal of each gate is exhibited with the same frequency.

FIG. 1 is a logic diagram exemplarily illustrating that the input error rate propagates to the output error rate in an AND gate according to an embodiment of the present invention.

Referring to FIG. 1, the input of the AND gate is denoted by "i" and "j", and the output is denoted by "o." The soft error rate (SER) generated from the gate input terminal or the inside of the gate due to alpha particles emitted from radioactive isotopes, thermal noise, neutrons, a change of external environment, and the like is denoted by "γ".

According to the present invention, the "γ" denotes the soft error rate generated from the inside of the gate and is used in the relating computational expression for easy description purposes. For example, although both the internal soft error rates of the inputs "i" and "j" of the AND gate are expressed as "γ," they may be different from each other. It is noted that a case where the same soft error rate is exhibited is a special case. A specific description for the soft error rate "γ" will be made below in the paragraphs relating to the computational expression.

"P(i)" denotes an error generation probability of the input "i" and can be expressed as a sum of the error rate $P_p(i)$ propagating from an output of the front stage and the soft error rate γ generated from the inside of the corresponding gate.

In addition, "P(j)" denotes an error generation probability of the input "j," and can be expressed as a sum of the error rate $P_p(j)$ propagating from the output of the front stage and the soft error rate γ generated from the inside of the corresponding gate.

"P(o)" denotes an error generation probability of the output "o" caused by the inputs "i" and "j."

A method of obtaining the error generation probability for the output "o" caused by the inputs "i" and "j" of the AND gate using the table of FIG. 1 will be described below in detail.

If a normal output results in "o=0," and an abnormal output results in "o=1" when the inputs "i" and "j" are set to "i=0" and "j=0," respectively, in the AND gate, this means the case where there are errors in both the inputs "i" and "j." Therefore, the error generation probability P(o) of the output "o" is expressed as "P(i)×P(j)."

If a normal output results in "o=1," and an abnormal output results in "o=0" when the inputs "i" and "j" are set to "i=1" and "j=1," respectively, in the AND gate, this means overall cases except for a case where no error occurs in neither the inputs "i" or "j."

Therefore, the error generation probability P(o) of the output "o" is expressed as "1−{(1−P(i))×(1−P(j))}." In the same way, if the inputs "i" and "j" are set to "i=0" and "j=1," and if the inputs "i" and "j" are set to "i=1" and "j=0," the error generation probability P(o) is expressed as "P(i)×(1−P(j))" and "(1−P(i))×P(j)," respectively.

Figure 2:
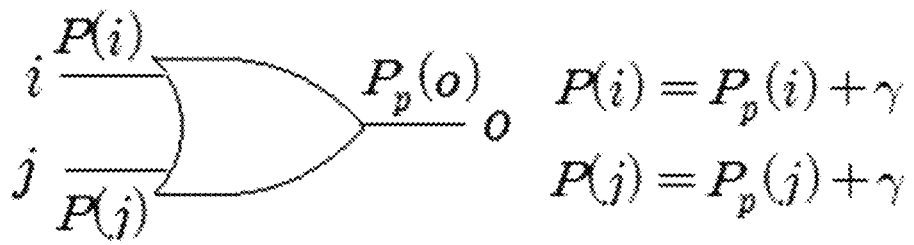
FIG. 2 is a logic diagram exemplarily illustrating that an error rate of the input propagates to an error rate of the output in an OR gate according to an embodiment of the present invention.

FIG. 2 is a logic diagram exemplarily illustrating that the input error rate propagates to the output error rate in an OR gate according to an embodiment of the present invention.

Referring to FIG. 2, similar to the AND gate, the input of the AND gate is denoted by "i" and "j," and the output is denoted by "o." Similarly, "P(i)" denotes an error generation probability of the input "i" and can be expressed as a sum of the error rate $P_p(i)$ propagating from the output of the front stage and the soft error rate γ.

"P(j)" denotes an error generation probability of the input "j," and can be expressed as a sum of the error rate $P_p(j)$ propagating from the output of the front stage and the soft error rate γ of the corresponding gate. "P(o)" denotes an error generation probability of the output "o" caused by the inputs "i" and "j."

A method of obtaining the error generation probability for the output "o" caused by the inputs "i" and "j" of the OR gate using the table of FIG. 2 will be described below in detail.

If a normal output results in "o=0," and an abnormal output results in "o=1" when the inputs "i" and "j" are set to "i=0" and "j=0," respectively, in the OR gate, this means overall cases except for a case where there is no error in neither the inputs "i" or "j." Therefore, the error generation probability P(o) of the output "o" is expressed as "1−{(1−P(i))×(1−P(j))}."

If a normal output results in "o=1," and an abnormal output results in "o=0" when the inputs "i" and "j" are set to "i=1" and "j=1," respectively, in the OR gate, this means a case where there are errors in both the inputs "i" and "j." Therefore, the error generation probability P(o) of the output "o" is expressed as "P(i)×P(j)." In the same way, if the inputs "i" and "j" are set to "i=0" and "j=1," and if the inputs "i" and "j" are set to "i=1" and "j=0," the error generation probability P(o) is expressed as "(1−P(i))×P(j)" and "P(i)×(1−P(j))," respectively.

Figure 3:
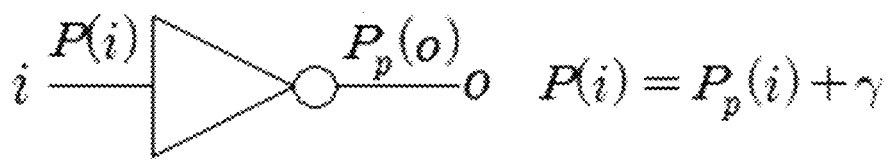
FIG. 3 is a logic diagram exemplarily illustrating that an error rate of the input propagates to an error rate of the output in a NOT gate according to an embodiment of the present invention.

FIG. 3 is a logic diagram exemplarily illustrating that the input error rate propagates to the output error rate in a NOT gate according to an embodiment of the present invention.

"P(i)" denotes an error generation probability of the input "i" and can be expressed as a sum of the error rate $P_p(i)$ propagating from the output of the front stage and the soft error rate γ. If there is an error in the input "i" with the error generation probability "P(i)," the error rate of the output "o" is set to "P(o)=P(i)."

A method of obtaining the error generation probability for the output "o" caused by the inputs "i" and "j" of the NOT gate using the table of FIG. 3 will be described below in detail.

The NOT gate has a single input and a single output. Therefore, if there is an error in the input terminal, an error also occurs in the output terminal. As a result, the error generation probability "P(o)" of the output "o" in the NOT gate is expressed as the error generation probability "P(i)" of the input "i".

In addition, other types of gates such as a NAND gate, a NOR gate, and an XOR gate included in a SoC can be expressed by creating a table similar to those of FIGS. 1 to 3.

Figure 4:
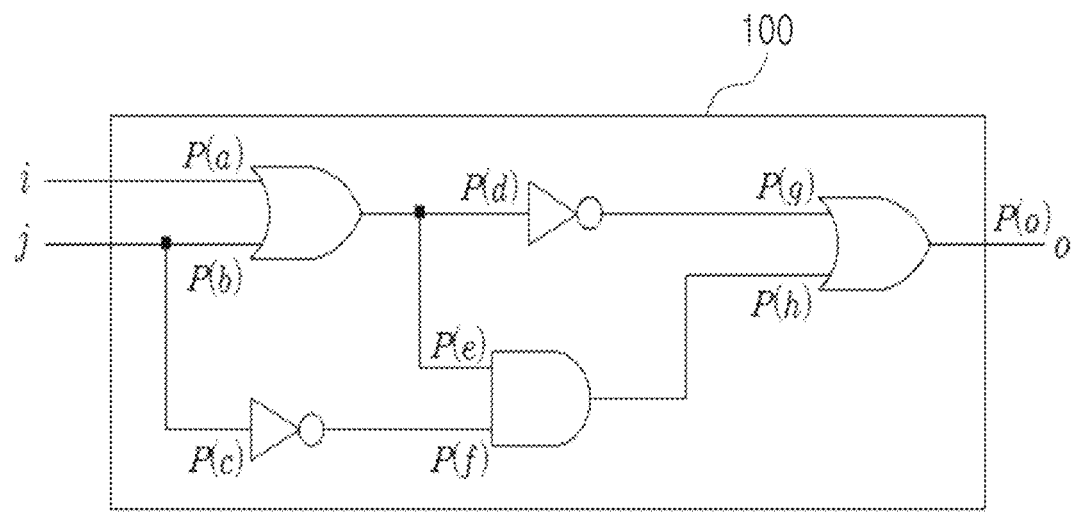
FIG. 4 is a block diagram exemplarily illustrating an error rate analysis method of a SoC internal block in a gate level according to an embodiment of the present invention.

FIG. 4 is a block diagram exemplarily illustrating a method of analyzing an error rate in an internal block of a SoC in a gate level according to an embodiment of the present invention.

FIG. 4 shows only a single internal block 100 in the entire SoC. This block 100 has inputs "i" and "j."

Referring to FIG. 4, several gates are included in the block 100. Each interconnection node between the gates has a respective error rate. The output of this block 100 is denoted by "o."

"P(o)" denotes an error generation probability of the output.

Although five gates, two block input ports, and a single output port are exemplarily illustrated in FIG. 4 for easy description purposes, the number of gates, the types of the gates, and the number of block inputs/outputs are not particularly limited in the present invention.

In order to complete an error model for agate-level error rate analysis, the inputs are applied to the block to check the error rate of the output.

For the error rate analysis, the inputs "i=0" and "j=0" are applied.

Considering the error rate propagating from an output of an external block to the inputs "i" and "j" and the soft error rate generated in the input terminal of the OR gate or the NOT gate or the gate element, the error rates P(a), P(b), and P(c) can defined as follows.

$$P(a)=P_p(a)+\gamma \quad (1)$$

$$P(b)=P_p(b)+\gamma \quad (2)$$

$$P(c)=P_p(c)+\gamma \quad (3)$$

In these expressions, the soft error rates inside the inputs "i" and "j" of the AND gate may be different. Although the soft error rate is expressed as "γ," it can be divided into "γ1" and "γ2" in reality. Therefore, if the soft error rates of the inputs "i" and "j" are equal to each other, this is a special case.

The soft error rate γ may be different for each gate of the circuit of FIG. 4.

Based on the equations for the error rate propagating from the input to the output of the OR gate and the NOT gate of FIGS. 2 and 3, the error rates $P_p(d)$, $P_p(e)$, and $P_p(f)$ can be defined as follows.

$$P_p(d)=1-[(1-(P_p(a)+\gamma)\times(1-(P_p(b)+\gamma))] \quad (4)$$

$$P_p(e)=1-[(1-(P_p(a)+\gamma)\times(1-(P_p(b)+\gamma))] \quad (5)$$

$$P_p(f)=P_p(c)+\gamma \quad (6)$$

In the equations above, if a soft error occurs in each gate under the inputs "i=0" and "j=0", the output of the OR gate results in "1", and the output of the NOT gate results in "0".

The inputs of the NOT gate and the AND gate of the next stage are set to "d=1", "e=1", and "f=0". The error rates P(d), P(e), and P(f) can be redefined as follows based on the soft error rates generated in the input terminals of the NOT gate and the AND gate or the gate element.

$$P(d)=P_p(d)+\gamma \quad (7)$$

$$P(e)=P_p(e)+\gamma \quad (8)$$

$$P(f)=P_p(f)+\gamma \quad (9)$$

Based on the equation regarding the inputs "d", "e", and "f", the input error rates of the NOT gate and the AND gate, and the error rate propagating to the output, the error rates $P_p(g)$ and $P_p(h)$ propagating to the output can be defined as follows.

$$P_p(g)=P_p(d)+\gamma \quad (10)$$

$$P_p(h)=[1-(P_p(e)+\gamma)]\times[P_p(f)+\gamma] \quad (11)$$

By sequentially applying the equations of the gates from the input of the block as described above, it is possible to define the error rate in the final output terminal. The error rate P(o) of the final output terminal can be expressed by the error rates $P_p(a)$, $P_p(b)$, and $P_p(c)$ propagating from the input first and the soft error rate γ defined in each internal gate.

According to the present invention, it is recommended that a special error correction technique be applied to the input generating a relatively high error rate by analyzing the error rates derived from FIG. 4.

In the method of deriving the error rate described above, such a technique of computing the output error rate depending on a combination of the inputs of each gate is too complicated and may be physically difficult in analysis and modeling of input information for overall gates based on the input information of the SoC if the SoC modeling is complicated. Therefore, according to the present invention, in order to derive an error model of each gate, an additional proposal will be made for a method of completing the modeling of the gates using statistic information regarding an input combination of each gate by executing a simulation.

In FIG. 1, the error rate $P_p(o)$ is determined as "P(i)*P(j)", "P(i)*(1−P(j))", "(1−P(i))*P(j)", and "1−{(1−P(i))*(1−P(j))}" for four possible inputs. For example, if input statistic information of a particular NAND gate is analyzed by performing a simulation using the gate-level model of the SoC, and an equation "x+y+z+w=1" is satisfied, where "x" denotes a proportion of frequency of the inputs "i=0" and "j=0," "y" denotes a proportion of frequency of the inputs "i=1" and "j=0", "z" denotes a proportion of frequency of the inputs "i=0" and "j=1", and "w" denotes a proportion of frequency of the inputs "i=1" and "j=1," the error rate $P_p(o)$ of this gate can be determined as follows: $P_p(o)=x*P(i)*P(j)+y*P(i)*(1−P(j))+z*(1−P(i))*P(j)+w*1−{(1−P(i))*(1−P(j))}$.

According to another embodiment of the present invention, if it is assumed that each input has the same proportion of frequency, i.e., (x=y=z=w=0.25), without analyzing input statistic information of the internal gate of the SoC, and the error rate of the gate is determined as "$P_p(o)=\{P(i)*P(j)+P(i)*(1−P(j))+(1−P(i))*P(j)+1−\{(1−P(i))*(1−P(j))\}\}/4$", it is possible to reduce a modeling time and complexity. In this case, the same types of gates inside a circuit have the same error propagation rate.

Figure 5:
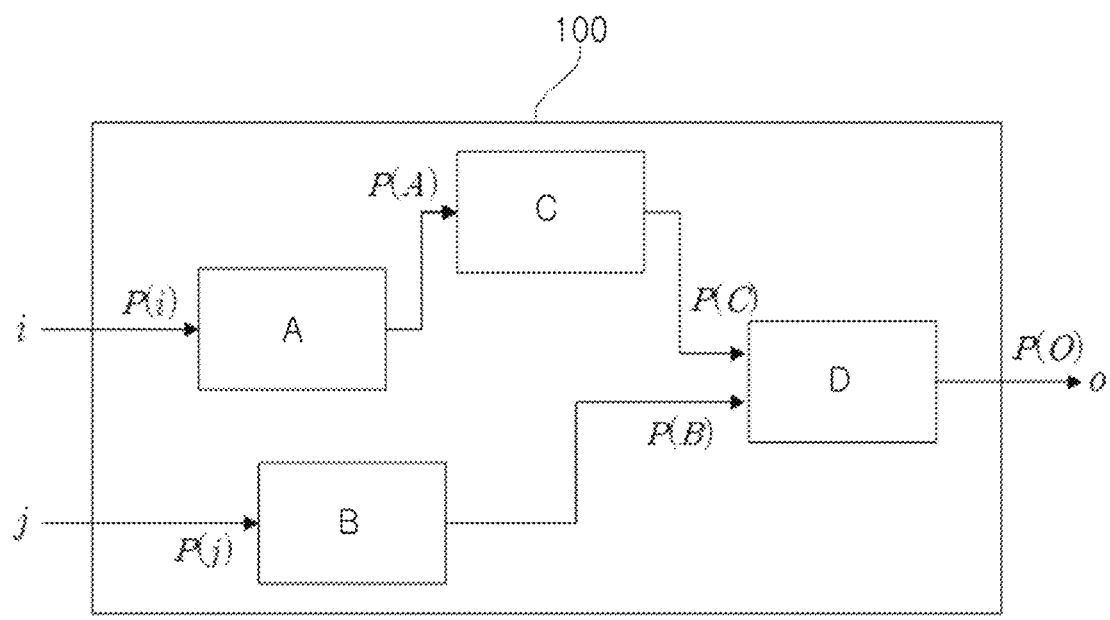
FIG. 5 is a block diagram exemplarily illustrating a gate-level error analysis method of the entire SoC according to an embodiment of the present invention.

FIG. 5 is a block diagram exemplarily illustrating a gate-level error analysis technology for the entire SoC according to an embodiment of the present invention.

FIG. 5 shows an exemplary gate-level error rate analysis method for the entire system. Using the error rate analysis method for the gates of the internal blocks in FIG. 4, it is possible to recognize a course of propagating the error rates generated from each block of the system to the final output and obtain the error rates thereof. Through this process, it is possible to allow a designer to determine a degree of the error correction technique for the block where errors frequently occur by comparing the error rates of each block of the entire system. Therefore, it is possible to reduce a reliability improvement cost.

Although exemplary embodiments of the present invention have been shown and described hereinbefore, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

What is claimed is:

1. A method of analyzing an error rate in a system-on-chip (soc) having at least one internal block obtained by interconnecting two or more gates, comprising:
    applying an input signal to an input terminal of a certain internal block;
    defining an input error rate of each gate of the internal block, the input error rate of each gate including a sum of a soft error rate of the gate and error rates for each possible input combination of the gate, the soft error rate generated from the input terminal or the inside of the gate due to alpha particles emitted from radioactive isotopes, thermal noise, neutrons, or a change of external environments; and
    defining an output error rate of the internal block based on the input error rate of each gate and an error rate propagating to an output terminal, the two or more gates including at least one of an OR gate having an error rate defined by $1−[(1−(P(a)+y)×(1−P(b)+y))]$ and a NOT gate having an error rate defined by $P(c)+y$, where P(a), P(b) and P(c) are error rates of inputs to the respective gate(s) and y is a soft error rate.

2. The method according to claim 1, further comprising: after defining the output error rate of the internal block, repeating a process of sequentially applying input signals for all possible cases and defining the output error rate of the internal block; and analyzing the defined output error rate to derive an error rate caused by the input of the internal block.

3. The method according to claim 1, wherein, in defining the output error rate of the internal block, the output error rate of the internal block is defined using on information regarding propagation of the error rate between the gates based on information regarding an interconnection network between the gates of the internal block.

4. The method according to claim 1, wherein input statistic information of each gate is analyzed by performing simulation, and the input error rate and the output error rate of each gate are modeled using the input statistic information.

5. The method according to claim 1, wherein the input error rate and the output error rate of each gate are modeled by assuming that the input signals applied to the input terminal of each gate are exhibited with the same frequency.

* * * * *